Dec. 12, 1961  R. J. HARASEK  3,013,149
ELECTRONIC CIRCUIT
Filed Feb. 15, 1960
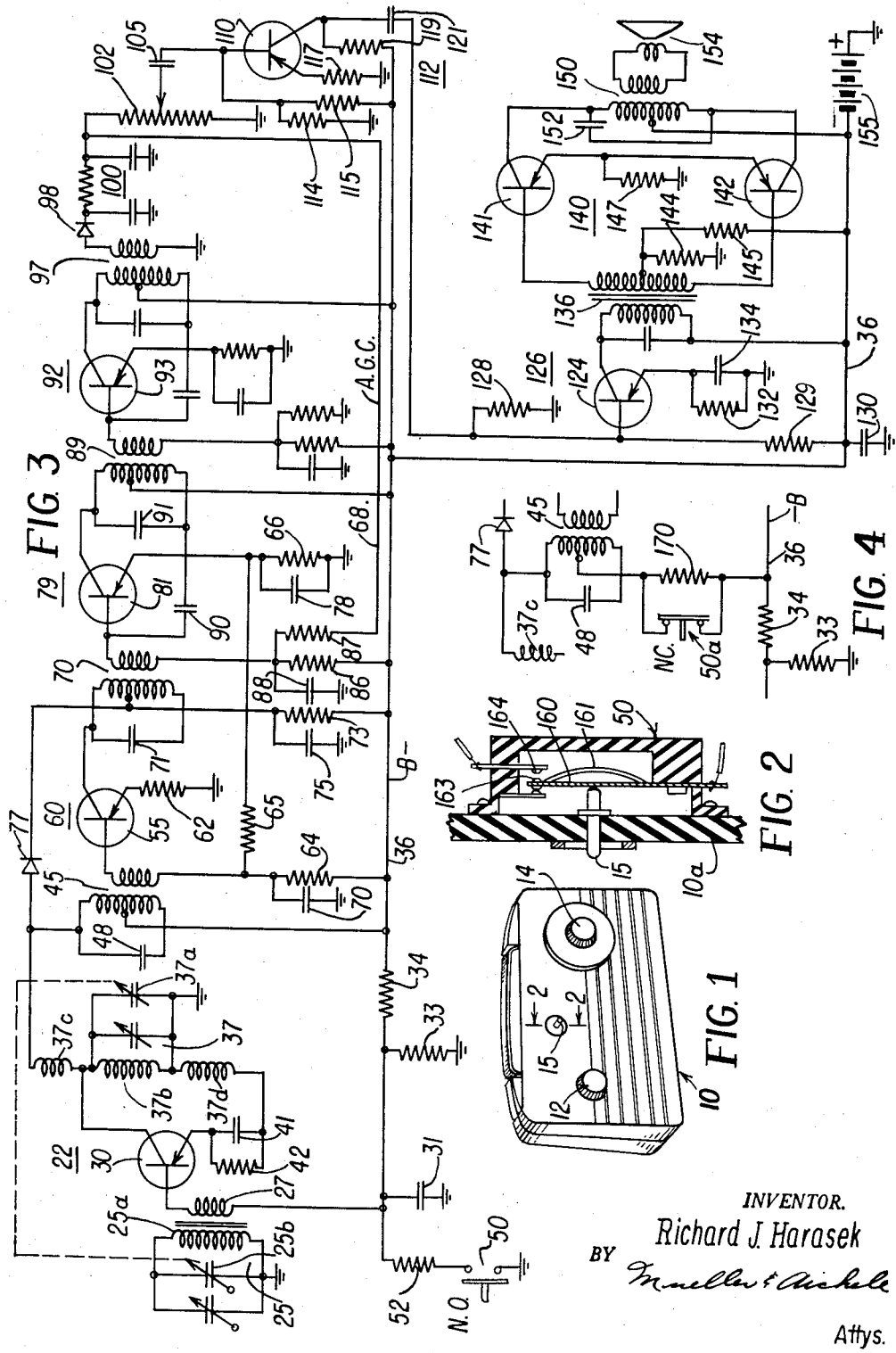
INVENTOR.
Richard J. Harasek
BY
Mueller & Aichele
Attys.

United States Patent Office 3,013,149
Patented Dec. 12, 1961

3,013,149
ELECTRONIC CIRCUIT
Richard J. Harasek, Chicago, Ill., assignor to Motorola, Inc., Chicago, Ill., a corporation of Illinois
Filed Feb. 15, 1960, Ser. No. 8,858
9 Claims. (Cl. 250—20)

This invention relates to battery operated electronic circuits and more particularly to a circuit useful in a battery operated radio receiver for determining the condition of the battery.

With the increasing availability of the improved and less expensive transistors, many present day radio receivers are built using transistors operable from a battery contained within the receiver housing. Generally these receivers are operable only from battery power and are not additionally operable from the household power lines, as were many of the portable vacuum tube receivers of the past. Thus, when the receiver battery power has decreased sufficiently, most transistor receivers are not useful until a new battery is installed. While one could have a spare battery, or a set of batteries on hand, these generally have a limited shelf life and they deteriorate even while not being used. Moreover, most battery operated transistor radios have a relatively low current drain so that a battery therefor has a desirably long useful life, making the replacement time somewhat unexpected, when it does arrive.

Accordingly, it is advantageous to have means for determining that the battery in a radio receiver is near the end of its useful life so that a new one could be obtained just prior to the actual time when the need arises. Thus, the new battery may be obtained just before it is required and there need be no interruption of use of the receiver. Of course, a battery can be tested by various means such as with a voltmeter, or an ammeter, or other electrical instruments. However, the average user of a transistor radio receiver generally does not have these instruments available and would rather avoid the involvements of making such measurements.

An object of the present invention is to provide an effective and inexpensive battery condition indicator for electronic circuits such as portable radio receivers.

Another object is to permit the user of a battery operated radio to test the receiver battery condition without opening the receiver housing and by merely a simple switch operation and observation of the receiver performance.

A further object is to provide a simple circuit for determining that a portable radio battery has been discharged to a given percentage of its useful life.

A feature of the invention is the provision of a resistor and switch coupled to a potential divider circuit in a stage of a receiver, with the resistor value related to a certain state of discharge of the receiver battery so that it can be switched into the circuit of the stage to disable that stage, and by failure of operation of the receiver thus indicate that the battery is at or below the particular state of discharge.

A further feature is the provision of an impedance selected to have a value for changing the operating condition of the mixer oscillator circuit of a radio receiver, as it is related to the voltage of the receiver power supply, and a switch for the impedance means so that such impedance means can be selectively coupled into the circuit of the mixer oscillator to provide indication of the battery condition through observation of the receiver output.

A more particular feature is the provision of a "test" resistor parallel coupled across a base bias resistor for the local oscillator in a transistorized battery operated radio and a normally open switch for disconnecting such test resistor, so that the switch can be operated, for example, from outside of the casing of the radio receiver, to raise the bias of the local oscillator transistor thereby disabling that circuit when the battery has discharged to a given and predetermined extent, thus indicating its condition by failure of oscillator in the local oscillator and consequent lack of output from the receiver.

In the drawings:
FIG. 1 is a perspective view of a radio receiver incorporating the invention;
FIG. 2 is a sectional view along the line 2—2 of FIG. 1;
FIG. 3 is a schematic diagram of the receiver of FIG. 1; and
FIG. 4 is a partial schematic diagram of the circuit of FIG. 3 showing a modified form of the invention.

In a specific form of the battery condition indicator a normally open switch is operable from the exterior of the receiver cabinet for a battery operated, transistorized superheterodyne radio. This switch is in series with a resistor which is coupled in shunt with a base bias resistor of the transistor providing the local oscillations in the receiver. The resistor has a value related to that of the normal bias network to provide a voltage drop, when the receiver battery voltage has reached a certain fraction of its rated voltage but still operates the receiver, which voltage drop will then render the local oscillator inoperative. Thus, if the receiver fails to provide output signals with the switch operated, that is closed, the user will thereby know that the receiver battery is at or below a power condition in which a new battery should be purchased to be substituted in the receiver. The particular value of the resistor chosen, as related to a particular condition of the receiver battery, can be determined to give a desired remaining number of hours of useful receiver performance thus giving the user of the receiver some time in which to obtain a replacement during which the receiver still may be used.

In FIG. 1 there is shown a portable radio receiver 10 having a knob 12 for volume adjustment and on-off control, as well as a knob 14 for tuning control. There is further a switch control 15 which is shown in cross-section in FIG. 2. Control 15 may be used to operate the battery condition indicator as explained subsequently.

Considering now the schematic diagram of FIG. 3, there is shown a tunable input circuit 25 which has an inductor 25a designed for pickup of radio frequency signals. The inductor 25a is inductively coupled to the impedance matching winding 27 and one side of this winding is coupled to the base of the transistor 30 in mixer-oscillator stage 22. The other side of inductor 27 is by-passed to ground for signal frequencies by means of capacitor 31. Base bias for transistor 30 is developed through potential divider action of resistors 33 and 34 which are series coupled between the B minus lead 36 and ground. The junction of bias resistors 33, 34 is coupled through inductor 27 to the base of transistor 30.

Tuning of the oscillator circuitry of the mixer-oscillator stage 22 is accomplished by means of the parallel tuned circuit 37. This tuned circuit includes a variable capacitor 37a which is ganged with variable capacitor 25b for tuning of the stage 22. Tuned circuit 37 also includes an inductor 37b which is inductively coupled to the impedance matching inductor 37d coupled from ground through the capacitor 41 to the emitter of transistor 30. The resistor 42 is coupled across capacitor 41 to provide emitter bias for transistor 30.

It will be understood that tuned circuit 25 will be tuned to the frequency of an incoming, or desired, signal and that tuned circuit 37 will be tuned to a frequency spaced from the incoming signal by the amount of the intermediate frequency of the receiver. For example, tuned circuit 37 may be tuned 455 kc. above the frequency of the incoming signal. Inductors 37b and 37d are also inductively coupled to feedback inductor 37c which is series connected between the collector of transistor 30 and the primary winding of intermediate frequency transformer 45. Inductor 37c provides regenerative feedback from collector to emitter to develop local oscillator signals to be heterodyned in transistor 30 so that the output to the primary winding of transformer 45 will be a signal converted to a fixed intermediate frequency, for example 455 kc.

The primary winding of transformer 45 is tuned by a tuning capacitor 48. A tapped point of this winding is coupled to the B minus lead 36 to provide impedance matching to the collector circuit of transistor 30.

The secondary winding of transformer 45 is coupled to the base of transistor 55. Transistor 55 serves as an amplifying device in the first intermediate frequency amplifier stage 60. Emitter bias is provided by means of resistor 62 connected between the emitter of transistor 55 and ground. Base bias for the transistor is developed by the voltage divider formed by resistors 64, 65 and 66, series connected between B minus lead 36 and ground. The junction of resistors 64, 65 is coupled through the secondary winding of transformer 45 to the base of transistor 55 and this point is further bypassed for RF signals by means of capacitor 70. The collector of transistor 55 is coupled to the primary winding of the intermediate frequency transformer 70 which is tuned by a tuning capacitor 71. An impedance matching tap point of the primary winding of this transformer is connected through the decoupling resistor 73 to the B minus lead 36. This tap point is also bypassed by means of the capacitor 75. The tap point of the primary winding of transformer 70 is further connected through a diode 77 to the junction of inductor 37c and the primary winding of transformer 45. Diode 77 is biased to be non-conductive in this arrangement until the signal level in the receiver overcomes the bias at which time it then effectively shunts the tuned circuit of the primary winding of transformer 45 (through capacitors 75, 130) and reduces the signal level applied to stage 60.

The second intermediate frequency amplifier stage 79 includes a transistor 81 having a base electrode connected to the secondary winding of transformer 70. This emitter is biased by means of a series coupled resistor 66 which is bypassed by capacitor 78. Base bias for transistor 81 is formed at the junction of resistors 86 and 87 which are coupled between the B minus lead 36 and the AGC lead 68. The junction of resistors 86, 87 is bypassed by capacitor 88 and coupled to the base through the secondary winding of transformer 70. Amplified output signals from transistor 81 are applied from the collector electrode thereof to the primary winding of transformer 89 which is tuned by a capacitor 91. A tap point of the primary winding is coupled to the B minus lead 36. The secondary winding of transformer 89 applies a degenerative signal through neutralizing capacitor 90 to the base of transistor 81 to neutralize the effect of collector to base capacity.

The third intermediate frequency amplifier stage 92 is substantially the same as stage 79. However, in this stage AGC is not applied to the base of transistor 93 but rather a fixed bias is applied thereto. The output signals from stage 92 are derived in the transformer 97 having a secondary winding coupled between ground and the detector diode 98. The detector diode is series coupled through an RF filter 100 to the fixed portion of the volume control potentiometer 102. The junction of the filter 100 and control 102 is coupled to lead 68 in order to develop the AGC potential for control of stage 79. Audio signals developed across the potentiometer control 102 are applied through the coupling capacitor 105 to the base of transistor 110 in the first audio amplifier stage 112.

Base bias for transistor 110 is formed at the junction of resistors 114 and 115 which are series connected between ground and B minus lead 36. The emitter electrode is series connected through bias resistor 117 to ground. The collector of load resistor 19 is series connected between the collector of transistor 110 and the B minus lead 36. Audio output signals are then applied through coupling capacitor 121 to the base electrode of transistor 124 in the audio driver stage 126.

Base bias for transistor 124 is developed at the junction of series connected resistors 128 and 129 which are series coupled between ground and B minus lead 36. Lead 36 is further bypassed by means of a filter condenser 130 to prevent audio feedback in the system. Emitter bias for transistor 124 is developed by the resistor 132 which is bypassed for audio frequencies by capacitor 134. Signals derived at the collector of transistor 124 are coupled to the primary winding of transformer 136 connected between the collector electrode and B minus lead 36.

The secondary winding of transformer 136 is connected between the base electrodes of transistors 141 and 142 in the push-pull audio output stage 140. A center tap of the secondary winding of transformer 136 is connected to the junction of bias resistors 144 and 145 which are connected between ground and B minus lead 36. Emitter bias for transistors 141, 142 is developed across resistor 147. The collectors of transistors 141, 142 are connected to opposite ends of the primary winding of the audio output transformer 150 which is shunted by high frequency suppressing capacitor 152. A center tap of the primary winding of this transformer is connected to B minus lead 36. The secondary winding of transformer 150 is coupled to the loudspeaker 154. The receiver is energized by means of a battery 155 connected between B minus lead 36 and ground.

From the foregoing description it should be apparent that the greater portion of the receiver thus described is of known design. However, attention will now be directed to the mixer oscillator stage 42 and more particularly to switch 50 and resistor 52.

In accordance with the circuit improvement previously discussed herein, the condition of the battery 155 can be determined by the operation of switch 50 and observation of receiver performance. Switch 50 is normally open and therefore resistor 52 normally has no influence on circuit operation. However, in order to test the battery the user of the receiver would close switch 50 thus placing resistor 52 in shunt with the base bias resistor 33 and providing a less negative voltage (with respect to ground) on the base to reduce the gain of transistor 30. The value of resistor 52 is chosen so that when the available output voltage of the battery 155 has dropped a certain amount under load conditions, that is, with the receiver operating, the voltage drop across resistor 52 with switch 50 closed will be sufficient to increase the base bias of transistor 30 by the proper amount to cause the local oscillator of the mixer-oscillator stage 22 to stop oscillating. With the local oscillator of the receiver non-operative, the receiver will no longer produce a signal of intermediate frequency to be amplified and detected. Thus, when a user of the receiver tunes a station and notes that no output comes from the speaker with switch 50 operated, whereas with the switch 50 unoperated an output signal is developed, he will know that the battery 155 has reached or is below the predetermined output voltage.

By proper selection of the value of resistor 52 as compared with the usual life span of battery 155 in the overall operation of the particular receiver, a reasonably accurate estimation of remaining useful battery life can be made. For example, the value of resistor 52 may be chosen so that the receiver tests as non-operative by use of switch 50 when the battery is down to or below 10% of its remaining useful life in the receiver. Thus, the user of the receiver can periodically test by merely operating switch 50 and when the point of receiver failure is noted with switch 50 closed, he will then know that the receiver is operating in a certain range of final hours of useful battery life.

It is preferable that the control switch 50 be available externally of the cabinet of the receiver 10. Accordingly, as shown in FIG. 2 the switch control 15 projects through the front panel 10a of the receiver 10 and this control may be used to operate the switch 50. This switch includes a movable arm 160 which is biased by spring member 161 so that the contacts 163, 164 are normally open. Operation of control 15 will close the contacts 163, 164 to place resistor 52 in the circuit as previously described.

In a successful receiver of practical construction component values were as follows:

| | | |
|---|---|---|
| Transistor 30 | | 2S52 |
| Capacitor 31 | mmfd | .05 |
| Resistor 33 | ohms | 6,800 |
| Resistor 34 | do | 33,000 |
| Capacitor 41 | mmfd | .01 |
| Resistor 42 | ohms | 2,200 |
| Resistor 52 | do | 5,600 |
| Battery 155 | volts | 6 |
| Current drain of stage 22 | milliamperes | .45 |
| Current drain of the entire receiver (zero signal) | milliamperes | 6.5 |

Such a circuit constructed with components of these values, and utilizing penlight size cells to compose the battery 155, provided a test indication of receiver failure on operation of switch 50 with approximately 90 percent of the battery life expended which, in the particular instance being considered, amounted to approximately 15 hours of remaining useful operation of the receiver on the particular set of batteries.

It may be recognized that a similar result for battery test can be achieved by inserting resistor 52 in the B minus lead 36 at some point between mixer oscillator stage 22 and battery 155. This would, however, tend to produce a marked decrease in signal output, or volume, due to the lowering of the voltage to either stage 60, 79, 92, 112, 126 or 140 when a battery condition test was made and the batteries still had a sufficient output voltage to maintain proper operation of the local oscillator section of the stage 22. Such a reduction of the volume of the output signal when the test is supposed to be indicating satisfactory battery condition, may be somewhat undesirable, and the circuit as shown is preferred.

It is also possible to modify the operation of the local oscillator of stage 22 by connecting, in series, a resistor and switch across either the primary winding of transformer 45 or the inductor 37b of the tuned circuit 37. It has been found possible to select a resistor having a value which will cause a stoppage of oscillation at a certain reduction of the battery supply voltage. However, a circuit of this type would require that a switch and resistor which are operating at radio frequency be wired into the receiver circuitry so that the test switch is in a satisfactory position for user operation, and this may be a practical disadvantage of this modification.

FIG. 4 shows a modification of the circuit of the invention which, as does the circuit of FIG. 3, involves merely the connection of the resistor and switch into the direct current energizing circuitry for the stage 22. In this figure the components corresponding to those of the circuit of FIG. 3 are given the same reference characters. Resistor 170 is series connected in the collector circuit, more particularly in the lead between B minus lead 36 and the tap of the primary of transformer 45. Switch 50a shunts resistor 170 and is normally open. During a battery condition test this switch is opened to place resistor 170 in the collector D.C. current supply thereby reducing its voltage. It is obvious that the value of resistor 170 is chosen so that by the inclusion of this resistor in the circuit the bias of the collector electrode of transistor 30 will be altered sufficiently, at the selected battery voltage in the receiver, such that the local oscillator portion of the stage 22 will cease oscillations at such chosen battery voltage. The circuit thus accomplishes the same purpose of the circuit of FIG. 3 except that the switch utilizes one which is normally closed rather than one which is normally open.

This invention provides, therefore, a simple and inexpensive battery condition test circuit. The circuit is particularly useful in a transistorized radio receiver which includes one battery for operating the entire circuitry. The circuit of the invention is advantageous for use in consumer type entertainment radios since the test switch may be positioned to be operated externally of the receiver and since the test indication would be immediately obvious to non-technical persons who were checking the battery, because it is merely necessary to operate a switch and listen to the sound from the loudspeaker in order to determine battery condition.

I claim:

1. In a transistorized battery operated circuit, oscillator circuit means including a transistor with tuning means and a bias network coupled to said transistor and adapted to be connected to a battery for energizing said circuit, utilization means coupled to said oscillator circuit means and capable of indicating operation and non-operation thereof, controllable impedance means connected to said oscillator circuit means for selectively changing the energization level of said transistor from power established by the battery, said impedance means having a value related to a given state of discharge of the battery for producing non-operation of said oscillator circuit means at such state of discharge of the battery, whereby control of said impedance means provides an indication of the existence of the battery condition at or below said given state.

2. In a transistorized battery operated circuit, oscillator circuit means including a transistor with tuning means and bias circuit means coupled to said transistor and adapted to be connected to a battery for energizing the circuit, utilization means coupled to said oscillator circuit means for indicating operation and non-operation thereof, a switch and resistor means connected to said bias circuit means for selectively changing the energization level of said transistor by the battery, said resistor means having a value related to a given state of discharge of the battery for producing non-operation of said oscillator circuit means with said switch operated at such state of discharge, whereby operation of said switch provides an indication at said utilization means of the existence of the battery condition at or below said given state.

3. In a battery operated radio receiver having a plurality of stages for translating signals in the radio frequency range, a detector stage for demodulating a received signal, and means for amplifying and reproducing a demodulated signal, the combination of a power supply circuit adapted to be coupled to the receiver battery, resistor means series coupled between said power supply circuit and at least one of said receiver stages to provide a bias for such stage, said resistor means having a value chosen with respect to a given state of discharge of the receiver battery to effectively disable said one stage with the receiver battery in that state of discharge, and a normally closed switch shunting said resistor means, whereby a user of the receiver can test the condition of the receiver battery by observation of change of receiver performance at the means for reproducing a demodulated signal upon operation of said switch.

4. In a battery operated radio receiver having a plurality of stages for translating signals in the radio frequency range, a detector stage for demodulating a received signal, and means for amplifying and reproducing a demodulated signal, the combination of a power supply circuit adapted to be coupled to the receiver battery, first resistor means coupled between said power supply circuit and at least one of said receiver stages to provide a bias for such stage, second resistor means and a normally open switch series connected across said second resistor means, said second resistor means having a value chosen with respect to a given state of discharge of the receiver battery to effectively disable said one stage with said switch closed and the receiver battery in that state of discharge, whereby a user of the receiver can test the condition of the receiver battery by observation of change of receiver performance with said switch open and closed.

5. In a superheterodyne radio receiver operated by a receiver battery, the combination of circuit means for generating a local oscillator signal and heterodyning such signal with a received signal to produce signals of intermediate frequency, said circuit means including electron valve means and a bias circuit coupled to said electron valve means and adapted to be direct current coupled to the receiver battery for applying a potential to said electron valve means the value of which potential depends upon the voltage of the receiver battery and the value of which potential must exceed a given level for operation of said circuit means in said receiver, impedance means intercoupled with switch means and connected to said bias circuit, said switch means having a first position to operatively disable said impedance means in said bias circuit and a second position to operatively connect said impedance means in said bias circuit for reducing the aforesaid potential, said impedance means having a value to reduce the aforesaid potential below the given level upon a predetermined state of discharge of the receiver battery, thereby determining the condition of the receiver battery by receiver failure with said switch in the second position thereof.

6. In a battery operated radio receiver having a plurality of stages including stages for translating a signal in the radio frequency range, a detector stage for demodulating a received signal, and means for amplifying and reproducing a demodulated signal as an output signal, the combination of a power supply circuit adapted to be coupled to the receiver battery, at least one of the aforesaid stages including electron valve means and a direct current biasing circuit coupled thereto with said biasing circuit providing an operating condition of said electron valve means for normal functioning of such one stage and translation of the signal thereby, switch means, and resistor means coupled with said switch means to said biasing circuit and said power supply circuit, said switch means being operable to disable said resistor means in said biasing circuit to provide the normal functioning of said one stage, and said switch means being operable to connect said resistor means into said biasing circuit, said resistor means having a value chosen with respect to a given state of discharge of the receiver battery to change the normal functioning of said electron valve and provide alteration in the overall receiver performance detectable to the user thereof as a change in the output signal when the given state of battery discharge is reached, whereby a user of the receiver can test the condition of the receiver battery by observation of receiver performance with said switch operated.

7. In a transistorized superheterodyne radio receiver operated by a receiver battery and including mixer-oscillator means for heterodyning a received signal to produce a signal of intermediate frequency, means for translating and demodulating the intermediate frequency signal, means for amplifying the modulated signal and a speaker for reproducing the demodulated signal as an output signal, the combination of a transistor and circuit means coupled thereto in the mixer-oscillator means for developing a local oscillator signal, a bias network connected to said transistor and adapted to be coupled to the receiver battery for establishing an energizing potential for said transistor, a resistor and switch connected to said bias network with said resistor connected to said bias network for altering the transistor bias in a first position of said switch and with said resistor effectively disconnected from said bias network in a second position of said switch, said resistor having a value related to a given condition of the receiver battery which is associated with an operative but fractional remaining power supply capability in the receiver to cause said local oscillator circuit means to stop production of the local oscillator signal so that failure of the output signal in the first switch position and production of the output signal in the second switch position indicates a battery condition within the fractional power supply capability.

8. A transistorized superheterodyne radio receiver operable by a receiver battery, including in combination, mixer oscillator circuit means for heterodyning a received signal, said mixer-oscillator circuit means including a transistor having base, emitter and collector electrodes, a bias network for said transistor including circuit portions connected respectively to said base, emitter and collector electrodes and adapted to be connected to the receiver battery, said circuit portion coupled to said collector electrode including a resistor series connected therein, a normally closed switch coupled across said resistor, said resistor having a value related to a given partially discharged condition of the receiver battery to cause lack of oscillation in said mixer oscillator circuit means with said switch in an open condition, and further receiver circuit means coupled to said mixer oscillator circuit means including a demodulating circuit and a transducer for demodulated signals so that the partially discharged condition of the receiver battery can be determined by production and non-production of demodulated signals by said transducer with said switch in the closed and open positions thereof.

9. A transistorized superheterodyne radio receiver operable by a receiver battery, including in combination, mixer oscillator circuit means for heterodyning a received signal, said mixer-oscillator circuit means including a transistor having base, emitter and collector electrodes, a bias network for said transistor including circuit portions connected respectively to said base, emitter and collector electrodes and adapted to be connected to the receiver battery, said circuit portion coupled to said base electrode including a first resistor for establishing bias of said base electrode, a normally open switch and a second resistor series coupled across said first resistor, said second resistor having a value related to a given partially discharged condition of the receiver battery to cause lack of oscillation in said mixer oscillator circuit means with said switch in a closed condition, and further receiver circuit means coupled to said mixer-oscillator circuit means including a demodulating circuit and a transducer for demodulated signals so that the partially discharged condition of the receiver battery can be determined by production and non-production of demodulated signals by said transducer with said switch in the open and closed positions thereof.

References Cited in the file of this patent
UNITED STATES PATENTS

| | | |
|---|---|---|
| 2,732,491 | Jeannot | Jan. 24, 1956 |
| 2,921,191 | Kennedy | Jan. 12, 1960 |
| 2,929,875 | Boughtwood et al. | Mar. 22, 1960 |